US012780644B2

(12) United States Patent
Flowers

(10) Patent No.: US 12,780,644 B2
(45) Date of Patent: Nov. 3, 2026

(54) BEVERAGE DISPENSING SYSTEM

(71) Applicant: Fletcher Flowers, Yemassee, SC (US)

(72) Inventor: Fletcher Flowers, Yemassee, SC (US)

( * ) Notice: Subject to any disclaimer, the term of this patent is extended or adjusted under 35 U.S.C. 154(b) by 273 days.

(21) Appl. No.: 18/583,252

(22) Filed: Feb. 21, 2024

(65) Prior Publication Data

US 2025/0263289 A1 Aug. 21, 2025

(51) Int. Cl.
*B67D 3/00* (2006.01)

(52) U.S. Cl.
CPC .................................. *B67D 3/0067* (2013.01)

(58) Field of Classification Search
CPC .... B67D 3/0067; B67D 3/047; B67D 3/0083; B67D 3/007; B67D 2210/00031; B67B 7/24
See application file for complete search history.

(56) References Cited

U.S. PATENT DOCUMENTS 3,696,969 A 10/1972 De Van
3,933,275 A 1/1976 Metzner
4,105,139 A 8/1978 Scholle
4,921,135 A * 5/1990 Pleet .......................... B67B 7/26 222/105
5,076,471 A * 12/1991 Coleman ................ B65D 88/62 222/105
7,434,705 B2 10/2008 Evangelista
7,975,879 B2 * 7/2011 Groesbeck ........... B67D 3/0022 220/592.2
D668,499 S 10/2012 Malinski
8,596,496 B2 12/2013 Malinski
2007/0284389 A1 12/2007 Jacobs
2008/0302819 A1 * 12/2008 Stuart .................... B65D 77/06 222/105
2009/0250489 A1 10/2009 Saunders
2010/0102087 A1 4/2010 Meike
2020/0317497 A1 * 10/2020 Zielonka .............. B67D 1/0075

FOREIGN PATENT DOCUMENTS

AU 2002301203 A1 * 6/2003 ........... B67D 3/0096
WO WO2012012692 1/2012

* cited by examiner

*Primary Examiner* — Donnell A Long

(57) ABSTRACT

A beverage dispensing system for receiving a liquid-filled bag and dispensing liquid therefrom includes a housing having a front wall, a rear wall, and a peripheral wall being attached to and extending between the front wall and the rear wall thereby bounding an interior space. The peripheral wall has a hole therein. The hole provides access to the interior space. The bag fits through the hole and is positionable in the interior space. A lid is pivotably attached to the peripheral wall adjacent to the hole, pivoting open to provide access to the interior space through the hole and pivoting closed to inhibit access to the interior space. A liquid-containing bag fits within the interior space through the hole. A spout assembly fluidly couples the bag with the housing, the fluid flowing outwardly from the bag through the spout assembly when the bag is positioned within the interior space.

11 Claims, 8 Drawing Sheets

BEVERAGE DISPENSING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to beverage dispensers and more particularly pertains to a new beverage dispenser for receiving a liquid-filled bladder and dispensing liquid therefrom.

(2) Description of Related Art Including Information Disclosed Under 37 CFR 1.97 and 1.98

The prior art relates to beverage dispensers. The prior art discloses various beverage dispensing housings that are couplable with bladders or bags that hold a liquid. For example, the prior art discloses boxed wine assemblies wherein the wine is stored in a plastic bag and the plastic bag is stored within a cardboard housing. However, such assemblies are typically designed for a single use, with the housings and the bladders being affixed together and the entire assembly being disposable after the liquid is completely dispensed from the bladder. Thus, there is a need in the art for a beverage dispensing system with a reusable housing that can be coupled to a bag filled with a fluid so that the fluid can be dispensed from the bag within the housing. There is also a need for a system having interchangeable, fluid-filled bags so that a user can exchange one fluid-filled bag for a different fluid-filled bag while using the same housing.

BRIEF SUMMARY OF THE INVENTION

An embodiment of the disclosure meets the needs presented above by generally comprising a housing having a front wall, a rear wall, and a peripheral wall being attached to and extending between the front wall and the rear wall thereby bounding an interior space. The peripheral wall has a hole therein. The hole provides access to the interior space. The bag fits through the hole and is positionable in the interior space. A lid is pivotably attached to the peripheral wall. The lid is positioned adjacent to the hole, pivoting open to provide access to the interior space through the hole and pivoting closed to inhibit access to the interior space. The embodiment further comprises a bag containing a liquid that fits within the interior space. The bag is positionable in the interior space through the hole. A spout assembly fluidly couples the bag with the housing, the fluid flowing outwardly from the bag through the spout assembly when the bag is positioned within the interior space.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description references the annexed drawings wherein.

DETAILED DESCRIPTION OF THE INVENTION

Figure 1:
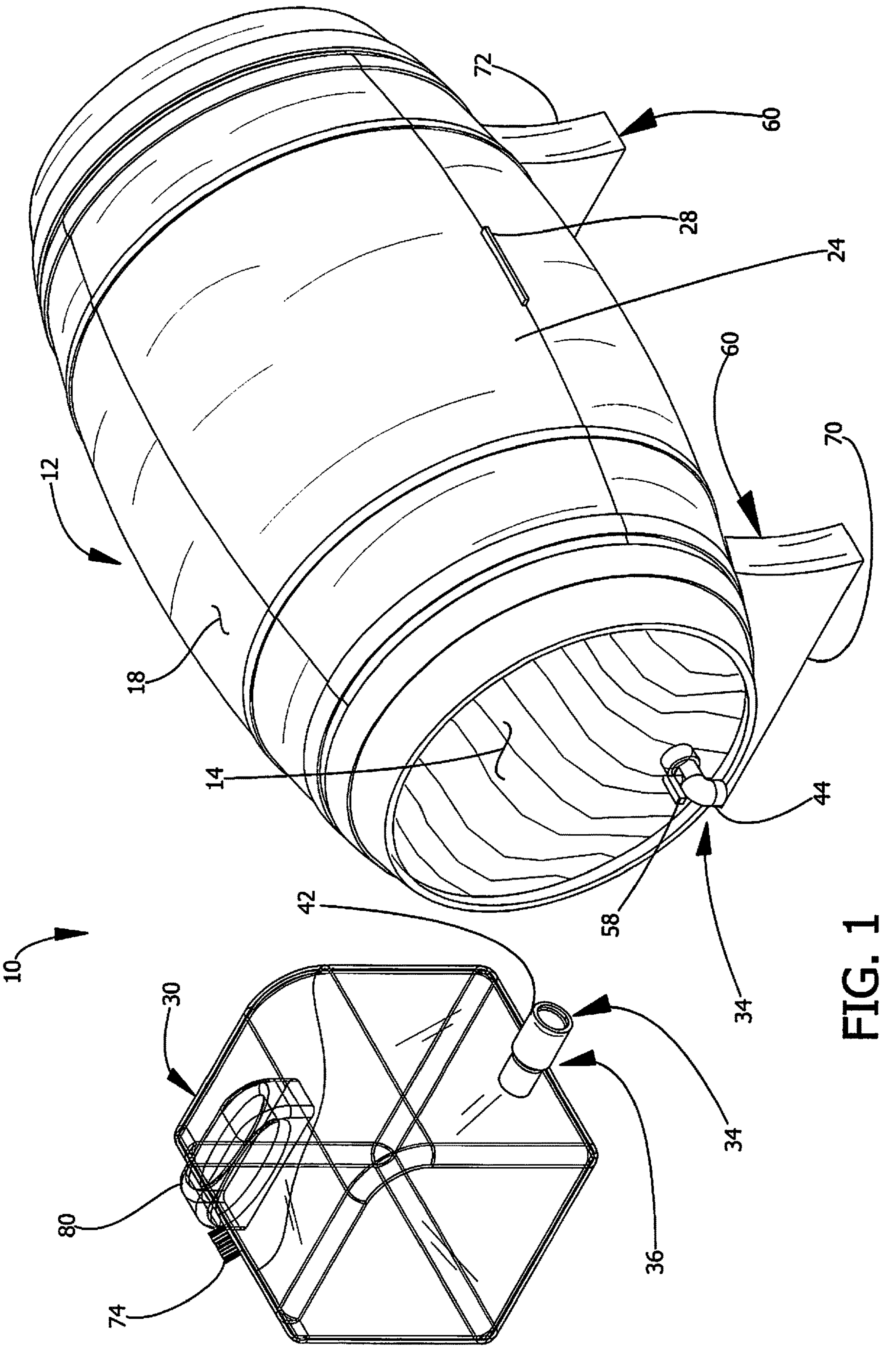
FIG. 1 is an isometric view of a beverage dispensing system according to an embodiment of the disclosure.
Figure 2:
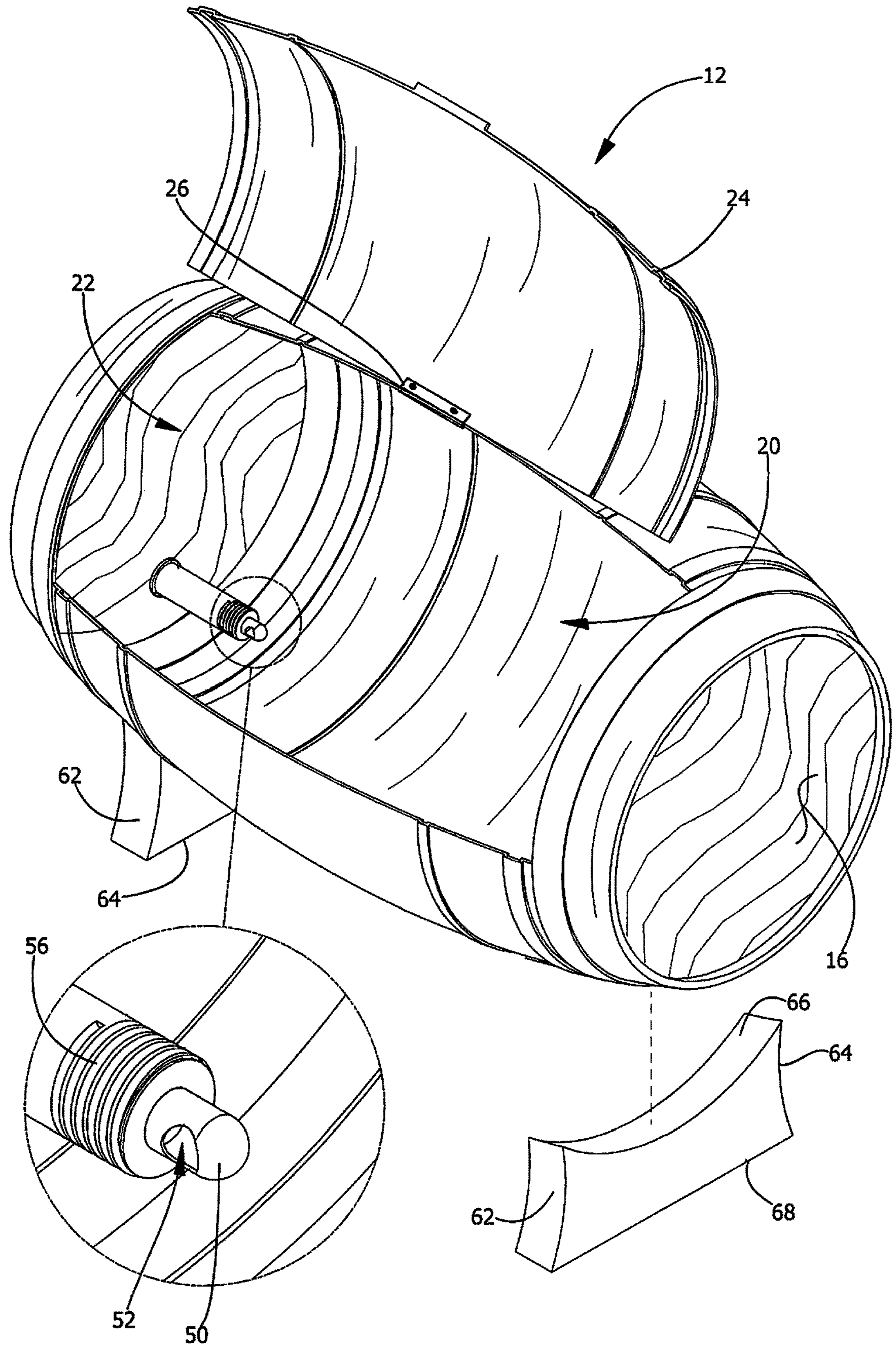
FIG. 2 is an isometric view of an embodiment of the disclosure.
Figure 3:
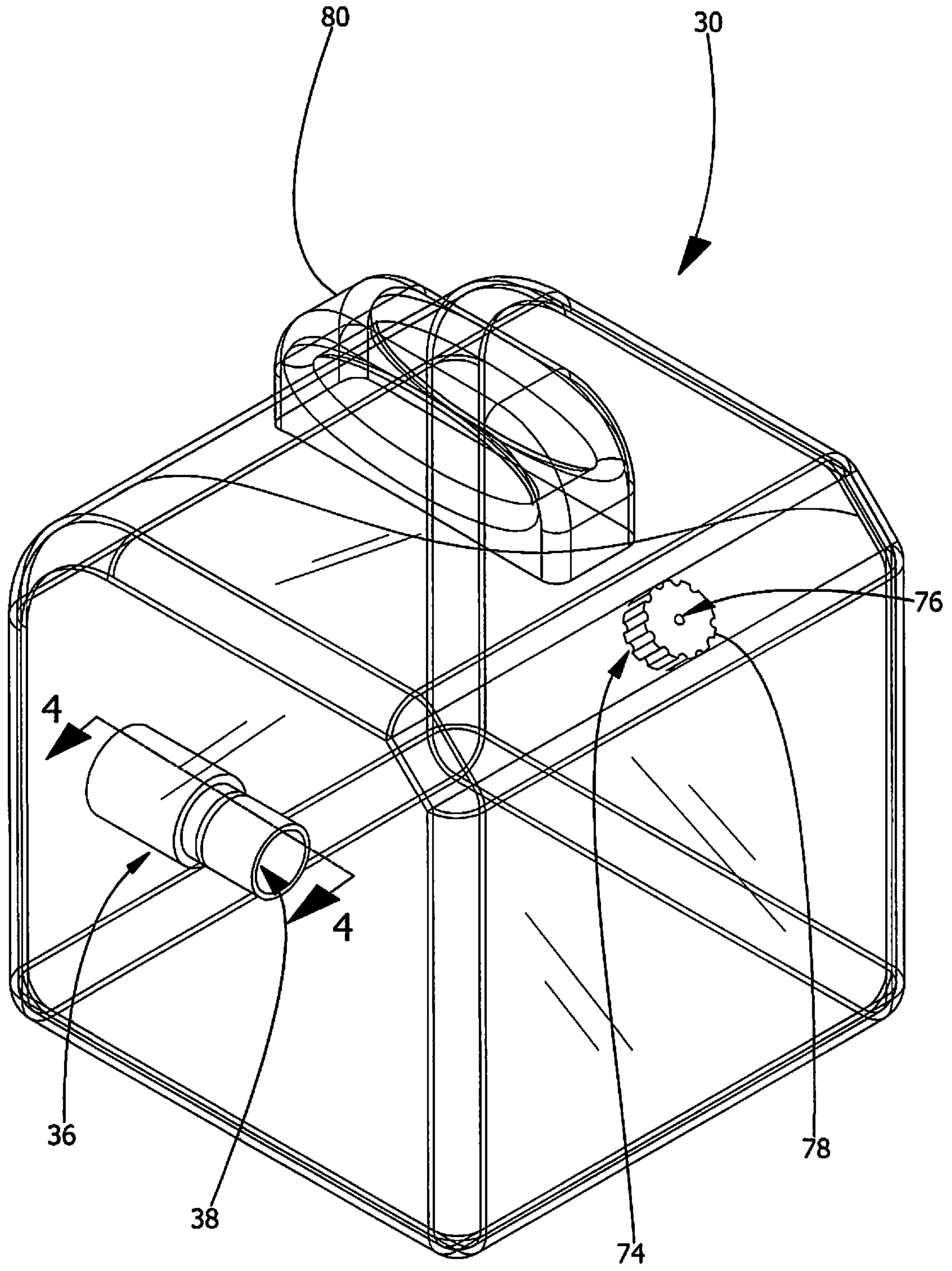
FIG. 3 is an isometric view of an embodiment of the disclosure.
Figure 4:
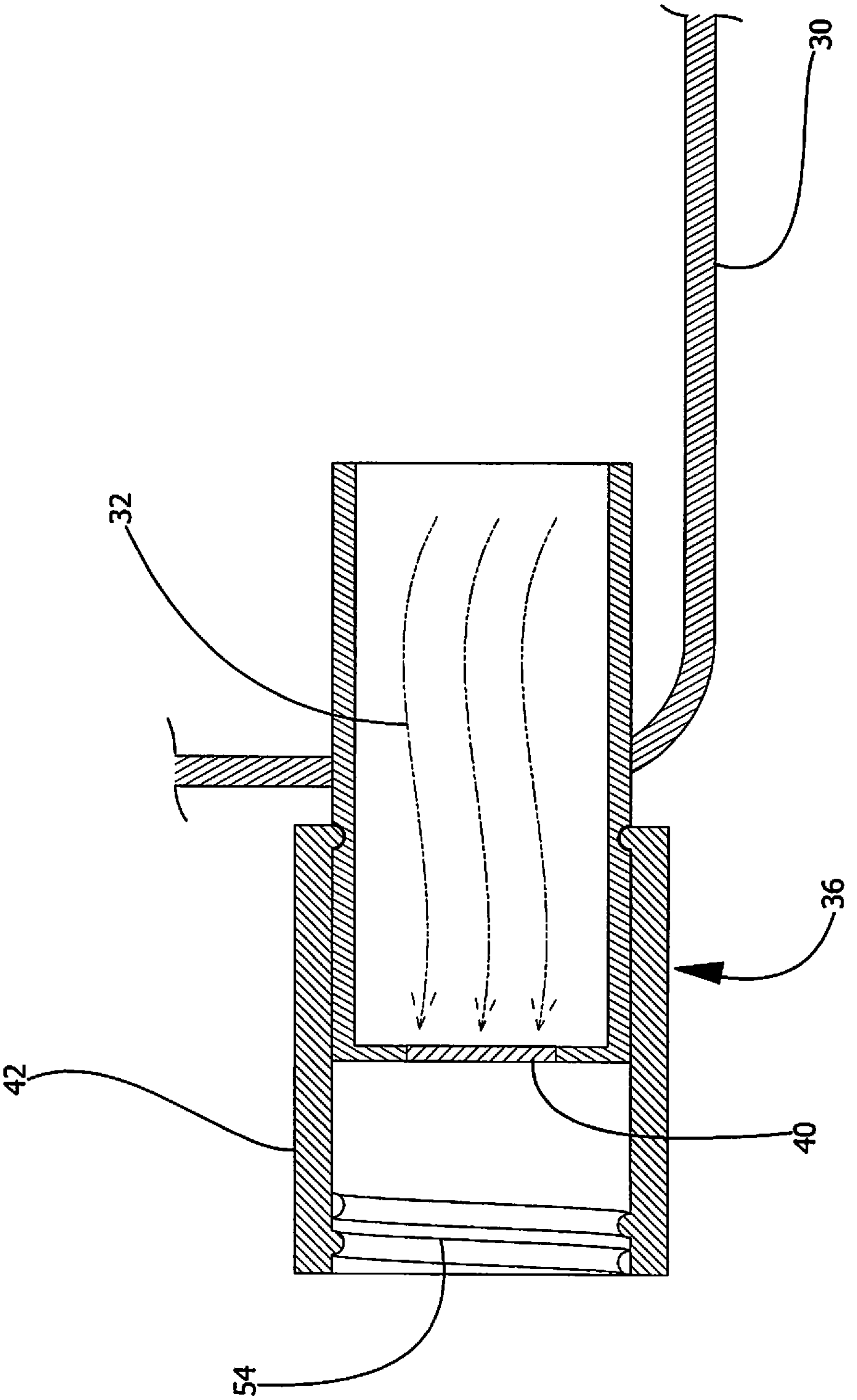
FIG. 4 is a cross-sectional view of an embodiment of the disclosure.
Figure 5:
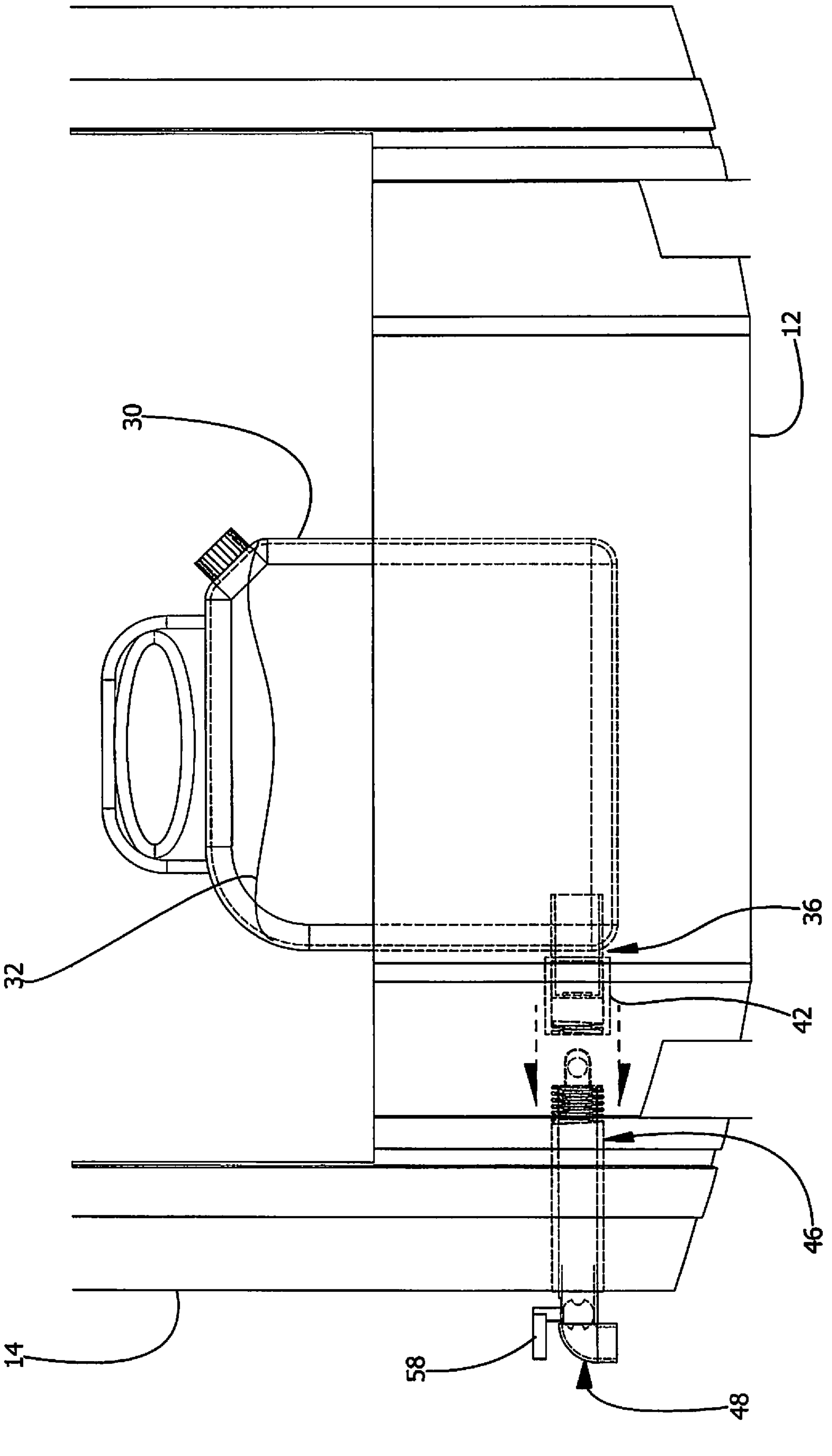
FIG. 5 is a side detailed view of an embodiment of the disclosure.
Figure 6:
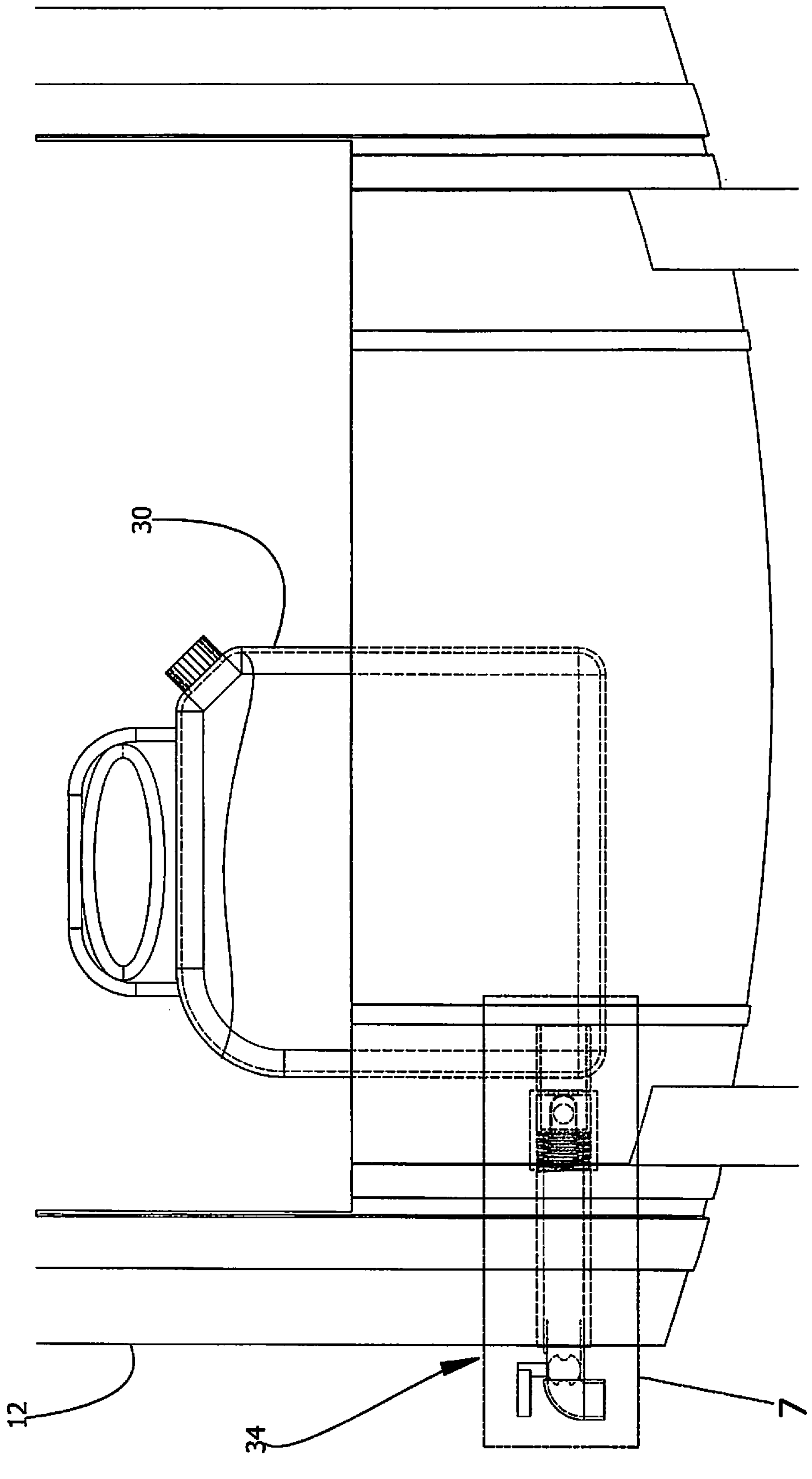
FIG. 6 is a side detailed view of an embodiment of the disclosure.

With reference now to the drawings, and in particular to FIGS. 1 through 8 thereof, a new beverage dispenser embodying the principles and concepts of an embodiment of the disclosure and generally designated by the reference numeral 10 will be described.

As best illustrated in FIGS. 1 through 8, the beverage dispensing system 10 generally comprises a housing 12 having a front wall 14, a rear wall 16, and a peripheral wall 18 being attached to and extending between the front wall 14 and the rear wall 16 thereby bounding an interior space 20. The peripheral wall 18 may be convexly arcuate between the front wall 14 and the rear wall 16. The front wall 14 and the rear wall 16 may be circular. In some embodiments, the housing 12 may be formed substantially in the shape of a barrel and may be decorated and designed to resemble a barrel, as shown in FIG. 1.

The peripheral wall 18 has a hole therein. The hole provides access to the interior space 20. A lid 24 is pivotably attached to the peripheral wall 18 and is positioned adjacent to the hole 22. The lid 24 pivots open to provide access to the interior space 20 through the hole 22 and pivots closed to inhibit access to the interior space 20. For example, a hinge 26 may pivotably couple the lid 24 to the peripheral wall 18. A grip 28 may be attached to the lid 24. In some embodiments, the grip 28 is positioned opposite the lid 24 from the hinge 26, such that a user 82 can pivot the lid 24 open when holding the grip 28.

The beverage dispensing system 10 further comprises a bag 30 containing a liquid 32. The bag 30 fits through the hole 22 when the lid 24 is open whereby the bag 30 is positionable within the interior space 20. For example, the bag 30 may comprise a flexible bladder, such as the plastic bags used for boxed wine. In typical embodiments, the bag 30 is configured for a single use, for example comprising plastic or other materials such that the bag 30 is disposable after the single use.

The bag 30 may be removed from the housing 12 and replaced with an alternative bag, for example containing a different liquid. In one such example, the bag 30 may contain whiskey and the alternative bag may contain rum. When the user 82 wants to serve rum, rather than whiskey, the user 82 can simply remove the bag 30 from the housing 12 and insert the alternative, rum-containing bag. In another such example, the user 82 may remove the bag 30 once all of the liquid 32 has been dispensed and replace the bag 30 with a new bag, containing either the same liquid 32 or a different liquid. A handle 80 may be attached to the bag 30 to facilitate positioning the bag 30 within the interior space 20 and exchanging the bag 30 with the alternative or new bag.

A spout assembly 34 fluidly couples the bag 30 with the housing 12. The liquid 32 flows outwardly from the bag 30 through the spout assembly 34 when the bag 30 is positioned within the interior space 20. Embodiments of the spout assembly 34 comprise a port 36 that is coupled to the bag 30, wherein the liquid 32 flows outwardly from the bag 30 through the port 36. The port 36 has an opening 38 therein. A seal 40 covers the opening 38. The seal 40 is breakable to expose the opening 38 whereby the liquid 32 is permitted to flow outwardly from the bag 30 through the opening 38 of the port 36. A cap 42 is rotatably coupled to the port 36.

A spout 44 is coupled to the front wall 14. The spout 44 has an inlet portion 46 and an outlet portion 48. The inlet portion 46 extends into the interior space 20 and the outlet portion 48 extends outwardly from the front wall 14. A stem 50 protrudes from the inlet portion 46. The stem 50 breaks through the seal 40 when the stem 50 physically contacts the seal 40. The stem 50 has a duct 52 extending therethrough, and the liquid 32 flows through the duct 52 when the stem 50 has broken the seal 40.

The cap 42 includes a cap threading 54 and the inlet portion 46 includes a spout threading 56. The cap threading 54 is complementary to the spout threading 56 such that the cap 42 is threadably couplable to the spout 44. Rotation of the cap 42 over the inlet portion 46 is configured to draw the stem 50 toward the seal 40 until the stem 50 physically contacts the seal 40 thereby breaking the seal 40 and exposing the opening 38 whereby the port 36 is fluidly coupled with the spout 44.

Figure 7:
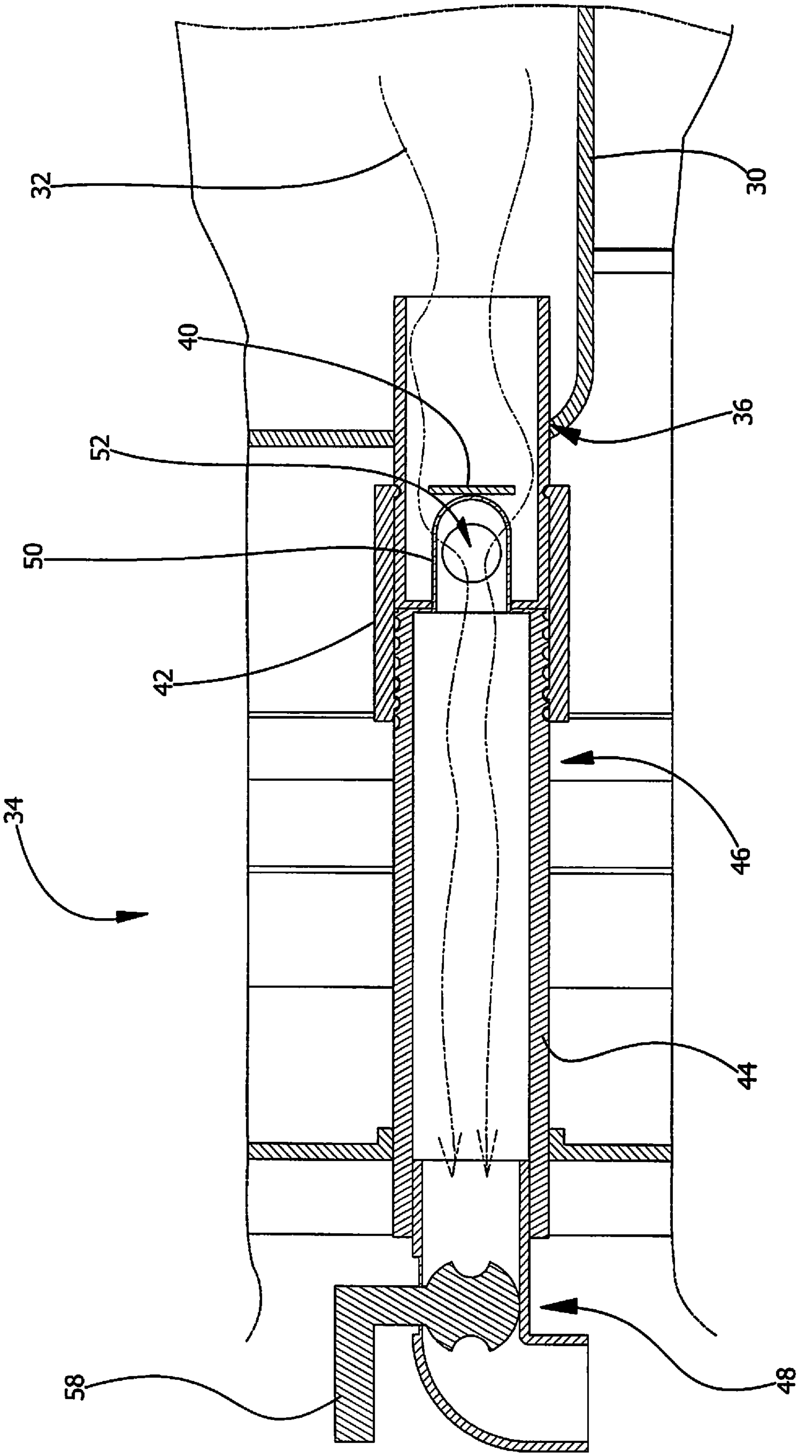
FIG. 7 is a detailed view of an embodiment of the disclosure.

A valve 58 is coupled to the outlet portion 48. The valve 58 is movable between an open position and a closed position. The liquid 32 flows outwardly though the outlet portion 48 when the valve 58 is in the open position and the liquid 32 is inhibited from flowing outwardly through the outlet portion 48 when the valve 58 is in the closed position. The example provided in FIG. 7 shows the valve 58 comprising a turn-ball valve, although other types of valves may also be used.

A support 60 may also be included in the beverage dispensing system 10. The support 60 is generally positionable beneath the housing 12. The support 60 is configured to hold the housing 12. In some embodiments, the support 60 has a first side 62, a second side 64, a top side 66, and a bottom side 68. The top side 66 may be concavely arcuate between the first side 62 and the second side 64 and the bottom side 68 may be flat. For example, the support 60 may include a first support 70 that is positioned proximate to the front wall 14 and a second support 72 that is positioned proximate to the rear wall 16. In such embodiments, the first support 70 is spaced from the second support 72. The support 60 may be removably positionable beneath the housing 12, or the support 60 may be attached or integrally coupled to the housing 12.

A ventilation mechanism 74 may be attached to the bag 30. The ventilation mechanism 74 can open to permit a gas into the bag 30 thereby increasing pressure within the bag 30 and facilitating the liquid 32 in flowing outwardly through the spout assembly 34. In some embodiments, the ventilation mechanism 74 includes the bag 30 having an aperture 76 therein, wherein the gas is permitted to flow into the bag 30 through the aperture 76 when the ventilation mechanism 74 is opened. A plug 78 may be attachable to the bag 30 over the aperture 76. For example, the plug 78 may be rotatably coupled to the bag 30 wherein rotation of the plug 78 in a first direction opens the ventilation mechanism 74 and rotation of the plug 78 in a second direction closes the ventilation mechanism 74 thereby inhibiting gas flow through the aperture 76.

Figure 8:
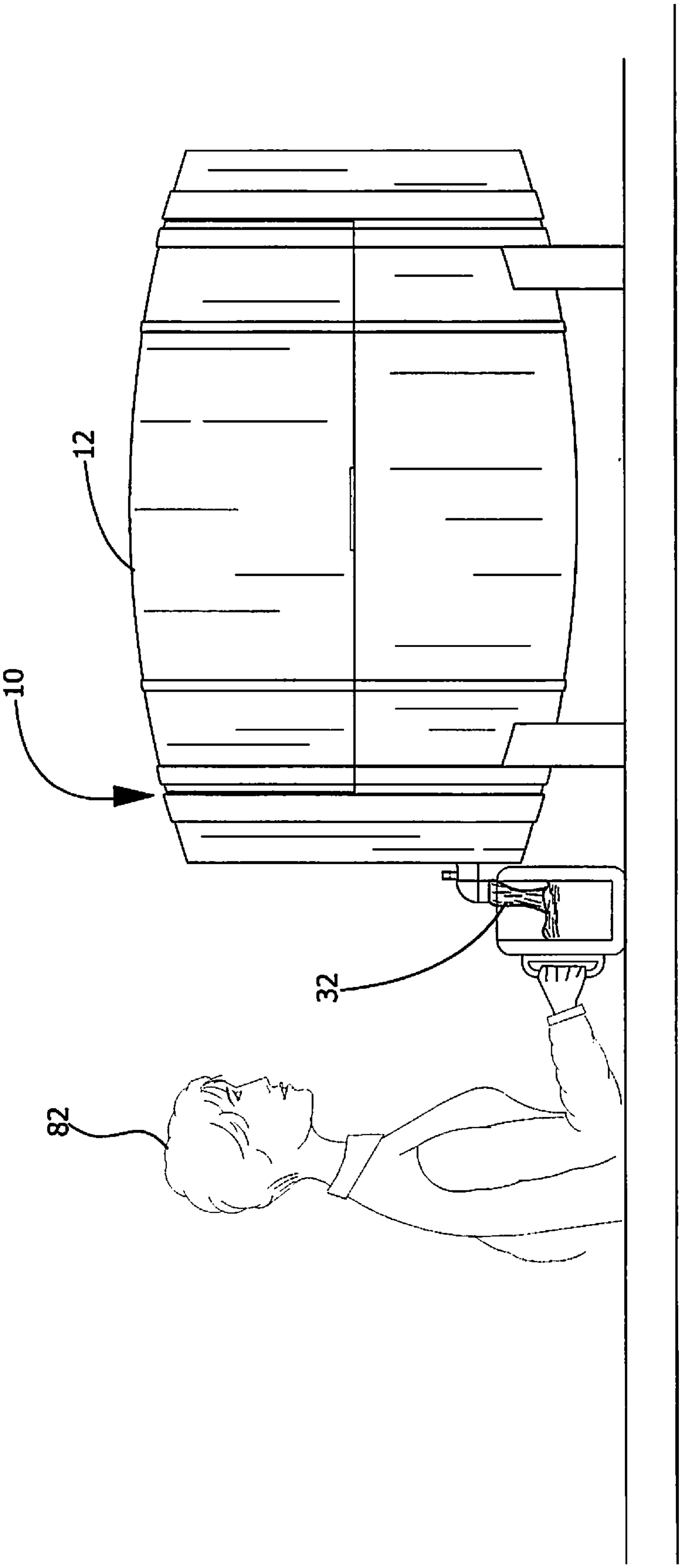
FIG. 8 is an in-use view of an embodiment of the disclosure.

In use, the bag 30 can be positioned in the interior space 20 with the port 36 adjacent to the spout 44. The spout assembly 34 can then be used to couple the bag 30 with the housing 12. In other words, the cap 42 can be rotated around the inlet portion 46 until the stem 50 breaks the seal 40, exposing the opening 38 of the port 36. The spout 44 is thereby fluidly coupled with the port 36 such that the liquid 32 can flow outwardly from the bag 30, through the port 36, and through the spout 44. The valve 58 can be adjusted to the open position to dispense the liquid 32 out of the housing 12, for example to serve a beverage as shown in FIG. 8. The valve 58 can be adjusted to the closed position to inhibit the liquid 32 from flowing out of the housing 12 and to retain the liquid 32 within the bag 30. When desired or needed, the bag 30 can be removed from the housing 12 by unscrewing the cap 24 from the inlet portion 46 and disconnecting the port 36 from the spout 44. The bag 30 can then be removed from the interior space 20 and exchanged with an alternative or new bag.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A beverage dispensing system comprising:

a housing having a front wall, a rear wall, and a peripheral wall being attached to and extending between the front wall and the rear wall thereby bounding an interior space;

the peripheral wall having a hole therein, the hole providing access to the interior space;

a lid being pivotably attached to the peripheral wall, the lid being positioned adjacent to the hole, the lid pivoting open to provide access to the interior space through the hole;

a bag containing a liquid, the bag fitting within the interior space, the bag being positionable in the interior space through the hole; and a spout assembly fluidly coupling the bag with the housing, the liquid flowing outwardly from the bag through the spout assembly when the bag is positioned within the interior space; and the spout assembly further comprising a port being coupled to the bag, wherein the liquid flows outwardly from the bag through the port;

the port having an opening therein;

a seal covering the opening, the seal being breakable to expose the opening whereby the liquid is permitted to flow outwardly from the bag through the opening of the port;

a cap being rotatably coupled to the port;

a spout being coupled to the front wall, the spout having an inlet portion and an outlet portion, the inlet portion extending into the interior space, the outlet portion extending outwardly from the front wall;

a stem protruding from the inlet portion, the stem breaking through the seal when the stem physically contacts the seal;

the stem having a duct extending therethrough, the liquid flowing through the duct when the stem has broken the seal; and the cap including a cap threading and the inlet portion including a spout threading, the cap threading being complementary to the spout threading such that the cap is threadably couplable to the spout, wherein rotation of the cap over the inlet portion is configured to draw the stem toward the seal until the stem physically contacts the seal thereby breaking the seal and exposing the opening whereby the port is fluidly coupled with the spout.

2. The beverage dispensing system of claim 1, further comprising a handle being attached to the bag.

3. The beverage dispensing system of claim 1, the peripheral wall being convexly arcuate between the front wall and the rear wall, the front wall and the rear wall being circular.

4. The beverage dispensing system of claim 1, further comprising a valve being coupled to the outlet portion, the valve being movable between an open position and a closed position, wherein the liquid flows outwardly though the outlet portion when the valve is in the open position, wherein the liquid is inhibited from flowing outwardly through the outlet portion when the valve is in the closed position.

5. The beverage dispensing system of claim 4, the valve further comprising a turn-ball valve.

6. The beverage dispensing system of claim 1, further comprising:

a ventilation mechanism being attached to the bag, the ventilation mechanism opening to permit a gas into the bag thereby increasing pressure within the bag and facilitating the liquid in flowing outwardly through the spout assembly.

7. The beverage dispensing system of claim 6, the ventilation mechanism further comprising:

the bag having an aperture therein, wherein the gas is permitted to flow into the bag through the aperture when the ventilation mechanism is opened; and a plug being attachable to the bag over the aperture, the plug being rotatably coupled to the bag wherein rotation of the plug in a first direction opens the ventilation mechanism and rotation of the plug in a second direction closes the ventilation mechanism thereby inhibiting the gas from flowing through the aperture.

8. The beverage dispensing system of claim 1, further comprising a support being positionable beneath the housing, the support being configured to hold the housing.

9. The beverage dispensing system of claim 8, the support further comprising a first side, a second side, a top side, and a bottom side, the top side being concavely arcuate between the first side and the second side, the bottom side being flat.

10. The beverage dispensing system of claim 8, the support further comprising:

a first support being positioned proximate to the front wall; and a second support being positioned proximate to the rear wall, the first support being spaced from the second support.

11. A beverage dispensing system comprising:

a housing having a front wall, a rear wall, and a peripheral wall being attached to and extending between the front wall and the rear wall thereby bounding an interior space, the peripheral wall being convexly arcuate between the front wall and the rear wall, the front wall and the rear wall being circular;

the peripheral wall having a hole therein, the hole providing access to the interior space;

a lid being pivotably attached to the peripheral wall, the lid being positioned adjacent to the hole, the lid pivoting open to provide access to the interior space through the hole, the lid pivoting closed to inhibit access to the interior space;

a bag containing a liquid, the bag fitting through the hole when the lid is open whereby the bag is positionable within the interior space;

a spout assembly fluidly coupling the bag with the housing, the liquid flowing outwardly from the bag through the spout assembly when the bag is positioned within the interior space, the spout assembly comprising:

a port being coupled to the bag, wherein the liquid flows outwardly from the bag through the port;

the port having an opening therein;

a seal covering the opening, the seal being breakable to expose the opening whereby the liquid is permitted to flow outwardly from the bag through the opening of the port;

a cap being rotatably coupled to the port;

a spout being coupled to the front wall, the spout having an inlet portion and an outlet portion, the inlet portion extending into the interior space, the outlet portion extending outwardly from the front wall;

a stem protruding from the inlet portion, the stem breaking through the seal when the stem physically contacts the seal;

the stem having a duct extending therethrough, the liquid flowing through the duct when the stem has broken the seal;

the cap including a cap threading and the inlet portion including a spout threading, the cap threading being complementary to the spout threading such that the cap is threadably couplable to the spout, wherein rotation of the cap over the inlet portion is configured to draw the stem toward the seal until the stem physically contacts the seal thereby breaking the seal and exposing the opening whereby the port is fluidly coupled with the spout;

a valve being coupled to the outlet portion, the valve being movable between an open position and a closed position, wherein the liquid flows outwardly though the outlet portion when the valve is in the open position, wherein the liquid is inhibited from flowing outwardly through the outlet portion when the valve is in the closed position, the valve comprising a turn-ball valve; and a support being positionable beneath the housing, the support being configured to hold the housing, the support having a first side, a second side, a top side, and a bottom side, the top side being concavely arcuate between the first side and the second side, the bottom side being flat, the support including:

a first support being positioned proximate to the front wall;

a second support being positioned proximate to the rear wall, the first support being spaced from the second support;

a ventilation mechanism being attached to the bag, the ventilation mechanism opening to permit a gas into the bag thereby increasing pressure within the bag and facilitating the liquid in flowing outwardly through the spout assembly, the ventilation mechanism including:

the bag having an aperture therein, wherein the gas is permitted to flow into the bag through the aperture when the ventilation mechanism is opened;

a plug being attachable to the bag over the aperture, the plug being rotatably coupled to the bag wherein rotation of the plug in a first direction opens the ventilation mechanism and rotation of the plug in a second direction closes the ventilation mechanism thereby inhibiting the gas from flowing through the aperture; and a handle being attached to the bag.

* * * * *